(12) United States Patent
Fang et al.

(10) Patent No.: US 11,256,348 B2
(45) Date of Patent: Feb. 22, 2022

(54) DISPLAY PANEL AND DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Zhixiang Fang, Beijing (CN); Jian He, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 283 days.

(21) Appl. No.: 16/329,508

(22) PCT Filed: Aug. 28, 2018

(86) PCT No.: PCT/CN2018/102661
§ 371 (c)(1),
(2) Date: Feb. 28, 2019

(87) PCT Pub. No.: WO2019/076139
PCT Pub. Date: Apr. 25, 2019

(65) Prior Publication Data
US 2020/0356202 A1 Nov. 12, 2020

(30) Foreign Application Priority Data
Oct. 18, 2017 (CN) .......................... 201710970651.7

(51) Int. Cl.
G06F 3/041 (2006.01)
G02F 1/1333 (2006.01)
(Continued)

(52) U.S. Cl.
CPC ........ *G06F 3/0412* (2013.01); *G02F 1/13338* (2013.01); *G02F 1/133512* (2013.01);
(Continued)

(58) Field of Classification Search
CPC combination set(s) only.
See application file for complete search history.

(56) References Cited

U.S. PATENT DOCUMENTS

2015/0355771 A1* 12/2015 Watazu ................. G06F 3/0445
345/174
2015/0378493 A1 12/2015 Kano et al.
(Continued)

FOREIGN PATENT DOCUMENTS

CN 105378609 A 3/2016
CN 105593798 A 5/2016
(Continued)

OTHER PUBLICATIONS

First Office Action and English language translation, CN Application No. 201710970651.7 (14 pages) (dated Mar. 29, 2019).
(Continued)

*Primary Examiner* — Robin J Mishler
(74) *Attorney, Agent, or Firm* — Myers Bigel, P.A.

(57) ABSTRACT

The present disclosure provides a display panel include one or more pressure sensing units, the one or more pressure sensing units being configured to sense a pressure input on the display panel. Each of the pressure sensing units includes a first upper electrode, a first lower electrode disposed opposite to the first upper electrode, and a piezoelectric material layer between the first upper electrode and the first lower electrode. There is further provided a display device comprising the display panel described above.

15 Claims, 4 Drawing Sheets

(51) Int. Cl.
　　　*G02F 1/1335* (2006.01)
　　　*G06F 3/044* (2006.01)

(52) U.S. Cl.
　　　CPC ........ *G02F 1/133514* (2013.01); *G06F 3/044* (2013.01); *G06F 2203/04105* (2013.01)

(56) References Cited

U.S. PATENT DOCUMENTS

| | | | |
|---|---|---|---|
| 2016/0231849 A1* | 8/2016 | Watazu | G06F 3/0445 |
| 2016/0364070 A1* | 12/2016 | Chen | G06F 3/0412 |
| 2017/0115799 A1* | 4/2017 | Shih | G06F 3/041 |
| 2017/0228072 A1* | 8/2017 | Amin | G06F 3/0412 |
| 2017/0269757 A1* | 9/2017 | Filiz | G01L 1/205 |

FOREIGN PATENT DOCUMENTS

| | | | |
|---|---|---|---|
| CN | 106843571 A | 6/2017 | |
| CN | 206249270 U | 6/2017 | |
| CN | 107037931 A | 8/2017 | |
| CN | 107728843 A | 2/2018 | |

OTHER PUBLICATIONS

International Search Report and Written Opinion of the International Searching Authority (with English language translation of Written Opinion), International Application No. PCT/CN2018/102661 (13 pages) (dated Dec. 5, 2018).

\* cited by examiner

DISPLAY PANEL AND DISPLAY DEVICE

CROSS REFERENCE TO RELATED APPLICATIONS

The present application is a 35 U.S.C. 371 national stage application of PCT International Application No. PCT/CN2018/102661, filed on Aug. 28, 2018, which claims the benefit of Chinese Patent Application No. 201710970651.7, filed on Oct. 18, 2017, the contents of which are incorporated herein by reference in their entireties.

FIELD

The present disclosure generally relates to the field of display. More specifically, the present disclosure relates to a display panel integrated with a pressure sensing unit and a display device comprising the display panel.

BACKGROUND

A touch screen comprising a touch panel and a display panel is an inductive display device that can receive an input signal. When a user touches a graphic button on a screen, a haptic feedback system on the screen can drive various components according to a pre-programmed program, thereby replacing a mechanical button panel, and creating a vivid audio and video effect by means of a liquid crystal display image. As the latest input device, the touch screen is the most simple, convenient and natural human-computer interaction manner at present. It gives multimedia a new look and is an attractive new multimedia interactive device.

The prior art couples a touch panel to an actuator to form a push button, which can generate an input based on pressing of the button and/or based on a touch event performed on the button surface. The appearance of the push button expands sensing of user input by the touch screen from the traditional two-dimensional space to a three-dimensional space, that is, the touch screen can not only sense the user's touch input on the touch screen plane, but also sense a one-stage even multi-stage press input in a direction perpendicular to the touch screen, which greatly enhances the user's interaction experience with the touch screen, and enriches the function of the touch screen. However, in the prior art, the actuator is usually coupled as an individual module to the touch panel, so that the size of the resulting touch screen is increased, which is contrary to the current technology development trend of thinness and portability.

In view of the above, there is a need in the art for an improved display panel and display device.

SUMMARY

It is an object of the present disclosure to provide a display panel and a display device comprising the display panel which are capable of at least partially alleviating or eliminating one or more of the above-mentioned problems in the prior art.

According to an aspect of the present disclosure, there is provided a display panel comprising one or more pressure sensing units. The one or more pressure sensing units are configured to sense a pressure input on the display panel. Each pressure sensing unit comprises a first upper electrode, a first lower electrode disposed opposite to the first upper electrode, and a piezoelectric material layer between the first upper electrode and the first lower electrode.

As used herein, the term "piezoelectric material" may refer to such a material: when it is pressed by a mechanical stress, its crystal structure will be deformed. The deformation of the crystal structure causes internal positive and negative charge centers to be separated instead of originally coinciding with each other. One end where the negative charge center lies attracts a positive charge, and one end where the positive charge center lies attracts a negative charge, so that two ends of the crystal exhibit charges with opposite signs, which results in an electric polarization phenomenon inside the piezoelectric material and exhibits output voltage and current externally. The larger the stress externally applied is, the greater the deformation of the crystal of the piezoelectric material will be, and the higher the generated voltage and current will be. When the externally applied stress is removed, the piezoelectric material returns to an uncharged state.

According to an embodiment of the present disclosure, the display panel further comprises one or more touch units configured to sense a touch input on the display panel.

According to an embodiment of the present disclosure, each touch unit comprises a second upper electrode, a second lower electrode disposed opposite to the second upper electrode, and a dielectric material layer between the second upper electrode and the second lower electrode.

In this embodiment, each touch unit is a capacitive touch unit. When a finger touches the second upper electrode of any touch unit, the capacitance value of a corresponding touch unit is changed. Sensing of the touch position can be achieved by detecting a change in the capacitance value of each touch unit.

According to an embodiment of the present disclosure, the first lower electrode of each pressure sensing unit is a strip electrode extending along a first direction, the second lower electrode of each touch unit is a strip electrode extending along a second direction intersecting the first direction, and the first lower electrode of each pressure sensing unit and the second lower electrode of each touch unit are electrically insulated from each other by an insulating layer.

According to an embodiment of the present disclosure, the first upper electrode of each pressure sensing unit is disposed in a same layer as the second upper electrode of each touch unit, the first upper electrode of each pressure sensing units and the second upper electrode of each touch unit are strip electrodes extending along the first direction, and first upper electrodes of the one or more pressure sensing units and second upper electrode of the one or more touch units are disposed alternately and electrically insulated from each other.

According to an embodiment of the present disclosure, the first upper electrode of each pressure sensing unit and the second upper electrode of each touch unit are strip electrodes extending along a first direction, and the first upper electrode of each pressure sensing unit and the second upper electrode of each touch unit are electrically insulated from each other by an insulating layer.

According to an embodiment of the present disclosure, the first lower electrode of each pressure sensing unit and the second lower electrode of each touch unit are strip electrodes extending along the first direction, and the first lower electrode of each pressure sensing unit and the second lower electrode of each touch unit are electrically insulated from each other by an insulating layer.

According to an embodiment of the present disclosure, the first upper electrode of each pressure sensing unit is a strip electrode extending along the second direction, the second upper electrode of each touch unit is a strip electrode extending along the first direction, and the first upper electrode of each pressure sensing unit and the second upper electrode of each touch unit are electrically insulated from each other by an insulating layer.

According to an embodiment of the present disclosure, the piezoelectric material layer includes one or more of zinc oxide, polyvinylidene fluoride, lead zirconate titanate, barium titanate, and lithium niobate.

According to an embodiment of the present disclosure, the display panel comprises a color filter substrate, an array substrate disposed opposite to the color filter substrate, and a liquid crystal layer between the color filter substrate and the array substrate. In such an embodiment, the display panel is a liquid crystal display panel.

According to an embodiment of the present disclosure, the one or more touch units are disposed on a side of the color filter substrate facing away from the array substrate.

According to an embodiment of the present disclosure, the one or more pressure sensing units are disposed between the color filter substrate and the liquid crystal layer.

According to an embodiment of the present disclosure, the one or more pressure sensing units are further configured as a shielding layer.

According to an embodiment of the present disclosure, the display panel comprises an array substrate, a package cover disposed opposite to the array substrate, and a luminescent material layer between the array substrate and the package cover. In such an embodiment, the display panel is a self-luminous display panel.

As used herein, the term "self-luminous display panel" refers to a display panel that does not require an additional backlight unit to effect display. For example, the self-luminous display panel includes an organic light emitting diode (OLED) display panel which realizes display using reversible color change generated by an organic semiconductor material driven by a current. For example, the self-luminous display panel includes a quantum dot display panel QLED which realizes display by performing electroluminescence or photoluminescence using an inorganic quantum dot material.

According to an embodiment of the present disclosure, the one or more touch units are disposed between the package cover and the luminescent material layer.

According to another aspect of the present disclosure, there is provided a display device comprising the display panel described in any of the above embodiments.

According to an embodiment of the present disclosure, the display device further comprises an operational amplifier and a feedback capacitor that is connected between a negative input terminal and an output terminal of the operational amplifier. A positive input terminal of the operational amplifier is connected to the first lower electrode of each pressure sensing unit, and the negative input terminal of the operational amplifier is connected to the first upper electrode of each pressure sensing unit.

In this embodiment, in the case where the piezoelectric material layer generates a small amount of charges when subjected to an external force, an operational amplifier is employed to amplify an electric signal generated by the piezoelectric material layer, so that the output of the pressure sensing unit is within a recognizable range of a detection circuit.

In addition, the display device has embodiments and advantages corresponding to or similar to the display panel described above, and details are not described herein again.

It should be understood that the above general description and the following detailed description are only exemplary and illustrative, which are not intended to limit the present disclosure in any way.

BRIEF DESCRIPTION OF THE DRAWINGS

These and other aspects of the present disclosure will be described in more detail with reference to the accompanying drawings, wherein the drawings are not necessarily drawn to scale, which focus on illustrating the principle of the present disclosure. In the drawings.

Throughout the drawings, the same reference numerals are used to denote the same parts.

Embodiments of the present disclosure are illustrated by the drawings described above, which will be described in more detail later. The drawings and the literal description are not intended to limit the scope of the concept of the present disclosure in any way, but illustrate the concept of the present disclosure for those ordinarily skilled in the art by reference to specific embodiments.

DETAILED DESCRIPTION

The present disclosure will now be described more comprehensively below with reference to the accompanying drawings in which embodiments of the present disclosure are illustrated. However, the present disclosure may be embodied in a number of different forms and should not be construed as being limited to the embodiments set forth herein. These embodiments are provided for the sake of completeness and thoroughness and for conveying the scope of the present disclosure to those skilled in the art in a comprehensive manner.

Figure 1:
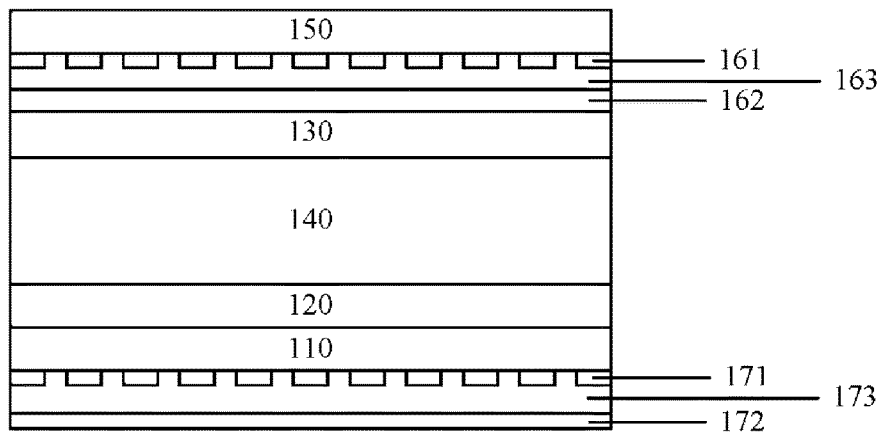
FIG. 1 schematically illustrates a sectional view of a pressure touch display device.

FIG. 1 schematically illustrates a sectional view of a pressure touch display device 100. As shown in FIG. 1, the pressure touch display device 100 comprises a backlight unit 110, an array substrate 120 disposed above the backlight unit 110, a color filter substrate 130 disposed opposite to the array substrate 120, a liquid crystal layer 140 located between the array substrate 120 and the color filter substrate 130, and a package cover 150 disposed above the color filter substrate 130.

In order to realize a touch function, the display device 100 comprises touch units located between the package cover 150 and the color filter substrate 130. Each touch unit includes an upper electrode 161, a lower electrode 162 disposed opposite to the upper electrode 161, and a dielectric material layer 163 located between the upper electrode 161 and the lower electrode 162. When a user touches the display device 100 with a finger or a stylus, the capacitance value of a touch unit at a corresponding position is changed. By detecting a change in the capacitance value of the touch units, the position touched by the user can be detected.

In order to realize a pressure sensing function, the display device 100 further comprises pressure sensing units located below the backlight unit 110. Each pressure sensing unit includes an upper electrode 171, a lower electrode 172 disposed opposite to the upper electrode 171, and a dielectric material layer 173 located between the upper electrode 171 and the lower electrode 172. When a user applies an external force on the display device 100 with a finger or a stylus, the applied external force causes a pressure sensing unit at a corresponding position to be deformed, thereby changing the distance between the upper electrode 171 and the lower electrode 172. Since the capacitance value of the pressure sensing unit is directly related to the distance between the upper electrode 171 and the lower electrode 172, by detecting a change in the capacitance value of the pressure sensing units, the position and amplitude of the external force applied by the user can be detected.

However, due to the addition of the touch units and the pressure sensing units, the thickness and the structural complexity of the display device 100 are both greatly increased, which is disadvantageous for achieving thinning and portability of the display device 100.

It is to be noted that although FIG. 1 illustrates the structure of the pressure touch display device taking a liquid crystal display device as an example, as will be appreciated by those skilled in the art, the above-mentioned problem is also present in a self-luminous display device. Similarly, although the pressure sensing unit is shown in FIG. 1 as being below the backlight unit 110, the pressure sensing unit may also be located at any position below the package cover 150, such as between the touch unit and the color filter substrate 130, between the color filter substrate 130 and the liquid crystal layer 140, between the array substrate 120 and the backlight unit 110, and the like, and the above-mentioned problem still exists.

Figure 2:
FIG. 2 schematically illustrates a sectional view of a display panel according to an embodiment of the present disclosure.

An embodiment of the present disclosure provides a display panel, as shown in FIG. 2. Similar to the display device 100, the display panel 200 comprises an array substrate 220, a color filter substrate 230 disposed opposite to the array substrate 220, a liquid crystal layer 240 located between the array substrate 220 and the color filter substrate 230, and a package cover 250 disposed above the color filter substrate 230. In particular, the display panel 200 further comprises one or more pressure sensing units 270 disposed between the color filter substrate 230 and the package cover 250. The one or more pressure sensing units 270 are configured to sense a pressure input on the display panel 200. Each of the pressure sensing units 270 includes a first upper electrode 271, a first lower electrode 272 disposed opposite to the first upper electrode 271, and a piezoelectric material layer 273 located between the first upper electrode 271 and the first lower electrode 272. Material of the piezoelectric material layer 273 may include one or more of zinc oxide, polyvinylidene fluoride, lead zirconate titanate, barium titanate, and lithium niobate.

Figure 3A:
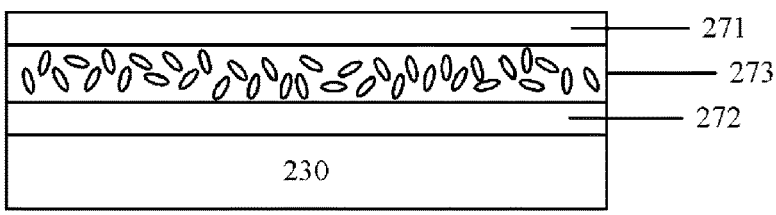
FIGS. 3a and 3b schematically illustrate the operating principle of a piezoelectric material layer.
Figure 3B:
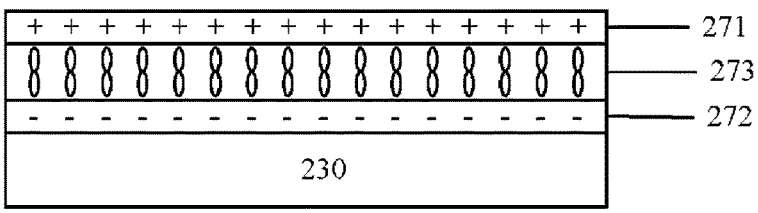

In embodiments of the present disclosure, pressure applied on the display panel 200 is sensed by means of the piezoelectric effect of the piezoelectric material layer 273. FIGS. 3a and 3b schematically illustrate situations before and after the piezoelectric material layer 273 is subjected to a stress, respectively. As shown in FIG. 3a, when the piezoelectric material layer 273 is not subjected to a stress, positive and negative charge centers of a crystal structure coincide with each other, and output voltage and current are not exhibited externally. When the piezoelectric material layer 273 is pressed by a stress (for example, a pressing force applied by a user on the display panel 200), as shown in FIG. 3b, the crystal structure is deformed. The deformation of the crystal structure causes internal positive and negative charge centers to be separated instead of originally coinciding with each other. One end where the negative charge center lies attracts a positive charge (for example, at the first upper electrode 271), and one end where the positive charge center lies attracts a negative charge (for example, at the first lower electrode 272), such that two ends of the crystal exhibit electrically opposite charges, which results in an electric polarization phenomenon inside the piezoelectric material and exhibits output voltage and current externally. The output voltage and current can be detected through the first upper electrode 271 and the first lower electrode 272. The larger the stress externally applied is, the greater the deformation of the crystal of the piezoelectric material will be, and the higher the generated voltage and current will be. When the externally applied stress is removed, the piezoelectric material layer 273 returns to an uncharged state.

Compared with the capacitive sensing manner shown in FIG. 1, since the piezoelectric material layer can be made very thin, the pressure sensing unit in embodiments of the present disclosure has a small overall thickness and may be advantageously integrated in the display panel, so that pressure sensing of the display panel can be realized without significantly increasing the size of the display panel, which in turn facilitates thinning and portability of the display panel.

Figure 4:
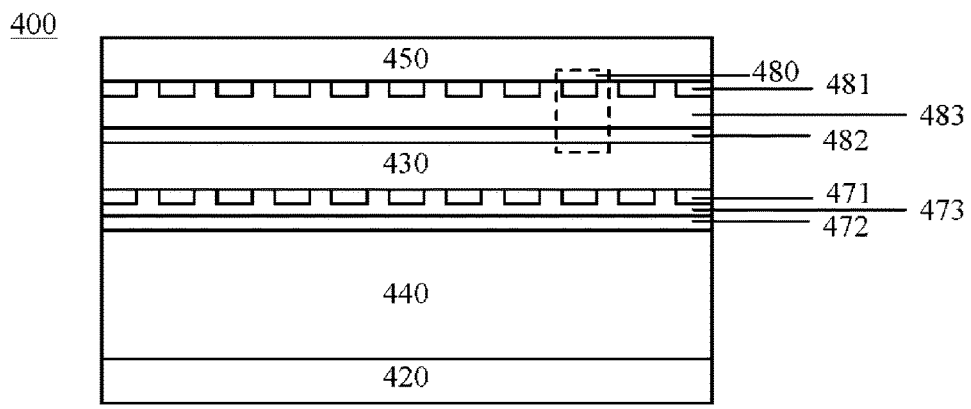
FIG. 4 schematically illustrates a sectional view of a display panel according to an embodiment of the present disclosure.

FIG. 4 schematically illustrates a sectional view of another display panel 400 according to an embodiment of the present disclosure. As shown in FIG. 4, the display panel 400 comprises an array substrate 420, a color filter substrate 430 disposed opposite to the array substrate 420, a liquid crystal layer 440 located between the array substrate 420 and the color filter substrate 430, and a package cover 450 disposed above the color filter substrate 430. The display panel 400 further comprises one or more pressure sensing units disposed between the liquid crystal layer 440 and the color filter substrate 430, and the one or more pressure sensing units are configured to sense a pressure input on the display panel 400. Each of the pressure sensing units includes a first upper electrode 471, a first lower electrode 472 disposed opposite to the first upper electrode 471, and a piezoelectric material layer 473 located between the first upper electrode 471 and the first lower electrode 472.

Different from the display panel shown in FIG. 2, the display panel 400 further comprises one or more touch units 480 disposed on a side of the color filter substrate 430 facing away from the array substrate 420. The one or more touch units 480 are configured to sense a touch input on the display panel 400. Each of the touch units 480 includes a second upper electrode 481, a second lower electrode 482 disposed opposite to the second upper electrode 481, and a dielectric material layer 483 located between the second upper electrode 481 and the second lower electrode 482.

As known to those skilled in the art, noise generated by the liquid crystal display panel during operation will adversely affect the normal operation of the touch unit. In order to prevent the noise of the liquid crystal display panel from affecting the touch unit, a shielding layer is typically disposed between the color filter substrate and the liquid crystal layer to shield the noise of the liquid crystal display panel. In this embodiment of the present disclosure, the one or more pressure sensing units disposed between the color filter substrate and the liquid crystal layer may not only realize a pressure sensing function, but also be configured to shield the influence of the noise of the array substrate on the one or more touch units. Therefore, in this embodiment, it is not necessary to arrange an individual shielding layer, and the first upper electrode and the first lower electrode of the pressure sensing unit are multiplexed into a shielding electrode to achieve both the noise shielding function and the pressure sensing function, which may in turn further facilitate thinning and portability of the liquid crystal touch display panel.

It is to be noted that although an embodiment of the present disclosure is described in FIG. 4 by taking a capacitive touch unit as an example, as will be appreciated by those skilled in the art, the principle of the present disclosure is also applicable to a display panel comprising other types of touch units such as a resistive touch unit. In such a display panel, since the piezoelectric material layer can be made very thin, the pressure sensing unit has a small overall thickness and can be advantageously integrated in the display panel, so that pressure sensing of the display panel can be realized without significantly increasing the size of the display panel, which in turn facilitates thinning and portability of the display panel.

It is to be noted that, the structures of the color filter substrate, the package cover, and the like are not described in detail in embodiments of the present disclosure for the purpose of simplifying description, which are widely known to those skilled in the art. For example, a polarizer POL is provided on the color filter substrate, and the package cover is adhered to the color filter substrate or the like using an optical adhesive OCA. Similarly, when the structures are being implemented, specific positions of the pressure sensing unit and the touch unit may be set as needed. For example, the pressure sensing unit may be disposed on the polarizer on the surface of the color filter substrate and adhered to the package cover by the optical adhesive; for example, the pressure sensing unit may be formed on the surface of the color filter substrate by coating, sputtering, or the like; for example, the touch unit may be disposed on the surface of a side of the package cover facing the color filter substrate. Similarly, the types of the upper and lower electrodes used in the pressure sensing unit and the touch unit may be selected as needed. A typical electrode is an ITO electrode. Other types of electrodes are also applicable, such as a carbon nanotube electrode, an organic transparent conductive thin film electrode, a nano metal wire, a graphene electrode, a metal oxide thin film electrode, and the like.

Figure 5:
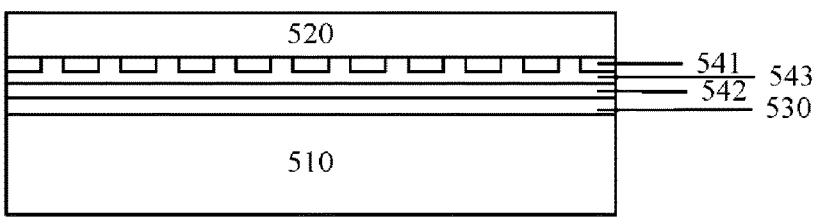
FIG. 5 schematically illustrates a sectional view of a display panel according to an embodiment of the present disclosure.

The principle of the present disclosure is also applicable to a self-luminous display panel. FIG. 5 illustrates a schematic sectional view of a further display panel according to an embodiment of the present disclosure. As shown in FIG. 5, the display panel 500 comprises an array substrate 510, a package cover 520 disposed opposite to the array substrate 510, and a luminescent material layer 530 located between the array substrate 510 and the package cover 520. In such an embodiment, the display panel 500 is a self-luminous display panel. The display panel 500 further comprises one or more pressure sensing units disposed between the package cover 520 and the luminescent material layer 530. The one or more pressure sensing units are configured to sense a pressure input on the display panel 500. Each of the pressure sensing units includes a first upper electrode 541, a first lower electrode 542 disposed opposite to the first upper electrode 541, and a piezoelectric material layer 543 located between the first upper electrode 541 and the first lower electrode 542.

Compared with the capacitive sensing manner shown in FIG. 1, in the embodiment shown in FIG. 5, since the piezoelectric material layer can be made very thin, the pressure sensing unit in the embodiment of the present disclosure has a small overall thickness and can be advantageously integrated in the display panel, so that pressure sensing of the display panel can be realized without significantly increasing the size of the display panel, which in turn facilitates thinning and portability of the display panel.

Although not shown, the display panel 500 shown in FIG. 5 further comprises one or more touch units disposed between the package cover 520 and the organic luminescent material layer 530, as will be understood by those skilled in the art. The one or more touch units are configured to sense a touch input on the display panel.

It is to be noted that although specific positions of the pressure sensing unit are illustrated in FIGS. 2, 4 and 5, the present disclosure is not so limited in this regard. Rather, those skilled in the art may design the position of the pressure sensing unit as needed. For example, in an exemplary embodiment, one or more pressure sensing units may be disposed below the array substrate.

It is to be noted that, embodiments of the present disclosure are described in FIGS. 2, 4 and 5 based on an example in which respective upper electrodes of the pressure sensing unit and the touch unit are sensing electrodes, and respective lower electrodes of the pressure sensing unit and the touch unit are common electrodes. However, the present disclosure is not so limited in this regard. In an alternative embodiment, respective upper electrodes of the pressure sensing unit and the touch unit may be common electrodes, and respective lower electrodes of the pressure sensing unit and the touch unit may be sensing electrodes.

Figure 6A:
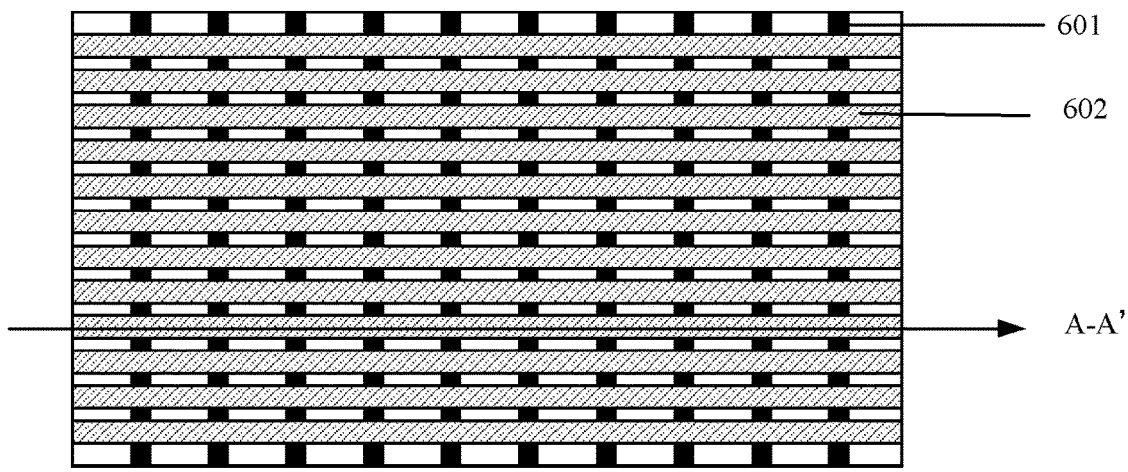
FIGS. 6a-6c schematically illustrate an arrangement of lower electrodes in a display panel according to an embodiment of the present disclosure, respectively.

FIG. 6a schematically illustrates a top view of an arrangement of lower electrodes in the display panel shown in FIG. 4. As shown in FIG. 6a, a first lower electrode 601 of each of the one or more pressure sensing units is a strip electrode extending along a first direction (the vertical direction in FIG. 6a), and a second lower electrode 602 of each of the one or more touch units is a strip electrode extending along a second direction (the horizontal direction in FIG. 6b) that intersects the first direction.

Figure 6B:
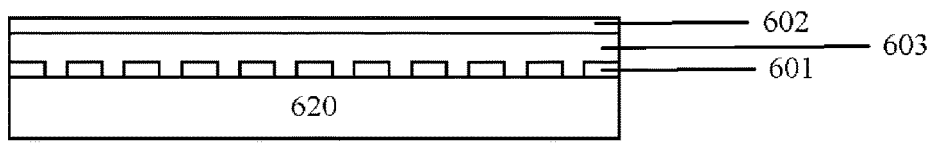

FIG. 6b schematically illustrates a sectional view of FIG. 6a along the direction A-A'. As shown in FIG. 6b, the first lower electrode 601 of each of the one or more pressure sensing units and the second lower electrode 602 of each of the one or more touch units are electrically insulated from each other by an insulating layer 603.

It is to be noted that although embodiments of the present disclosure are described in FIG. 4, FIG. 6a and FIG. 6b based on an example in which the second lower electrode 602 of each of the one or more touch units is disposed above the first lower electrode 601 of each of the one or more pressure sensing units, the present disclosure is not so limited. In an exemplary embodiment, the one or more pressure sensing units may be arranged above the one or more touch units, and at that time, as shown in FIG. 6c, the second lower electrode 602 of each of the one or more touch units is arranged below the first lower electrode 601 of each of the one or more pressure sensing units, and the first lower electrode 601 of each of the one or more pressure sensing units and the second lower electrode 602 of each of the one or more touch units are electrically insulated from each other by the insulating layer 603.

Figure 6C:
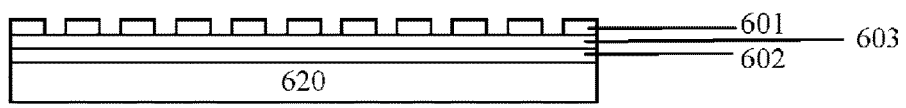

In FIGS. 6b and 6c, the reference numeral 620 generally denotes a structure below the touch unit and pressure sensing unit, such as an array substrate.

Figure 7:
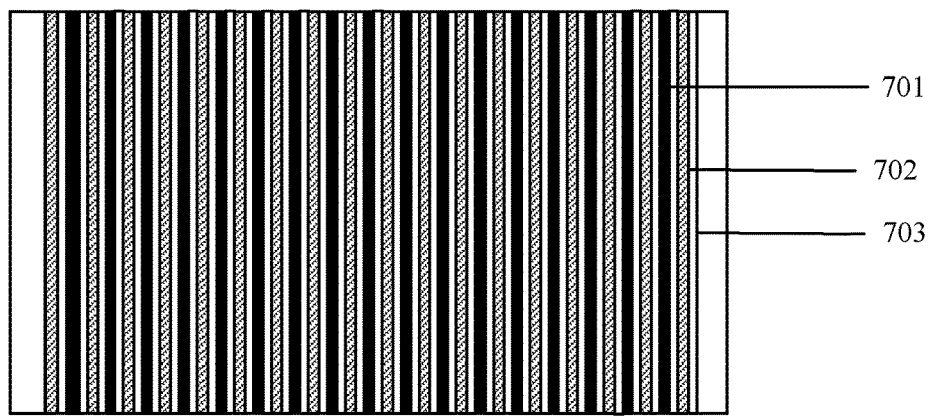
FIG. 7 schematically illustrates an arrangement of upper electrodes in a display panel according to an embodiment of the present disclosure.

FIG. 7 schematically illustrates a top view of an arrangement of upper electrodes of the display panel shown in FIG. 4. As shown in FIG. 7, a first upper electrode 701 of each of the one or more pressure sensing units is disposed in the same layer as a second upper electrode 702 of each of the one or more touch units, wherein the first upper electrode 701 of each of the one or more pressure sensing units and the second upper electrode 702 of each of the one or more touch units are strip electrodes extending along a first direction (the vertical direction in FIG. 7), and the first upper electrodes 701 of the one or more pressure sensing units and the second upper electrodes 702 of the one or more touch units are alternately disposed and electrically insulated from each other by the insulating layer 703.

In this embodiment, the first upper electrode of each of the one or more pressure sensing units is disposed in the same layer as the second upper electrode of each of the one or more touch units, which can thus minimize the thickness of the display panel while realizing both touch sensing and pressure sensing, which in turn facilitates thinning and portability of the liquid crystal touch display panel.

When the lower electrodes shown in FIG. 6a are used in combination with the upper electrodes shown in FIG. 7, the directions along which the second upper electrode 702 of each of the one or more touch units and the second lower electrode 602 of each of the one or more touch units extend intersect each other, so multi-touch can be realized by performing scanning in a row direction and a column direction, respectively. In contrast, since the first upper electrode 701 of each of the one or more pressure sensing units and the first lower electrode 601 of each of the one or more pressure sensing units extend along the same direction, and orthographic projections thereof on the lower structure 620 at least partially overlap, only single-point pressure sensing is realized on the display panel.

Figure 8A:
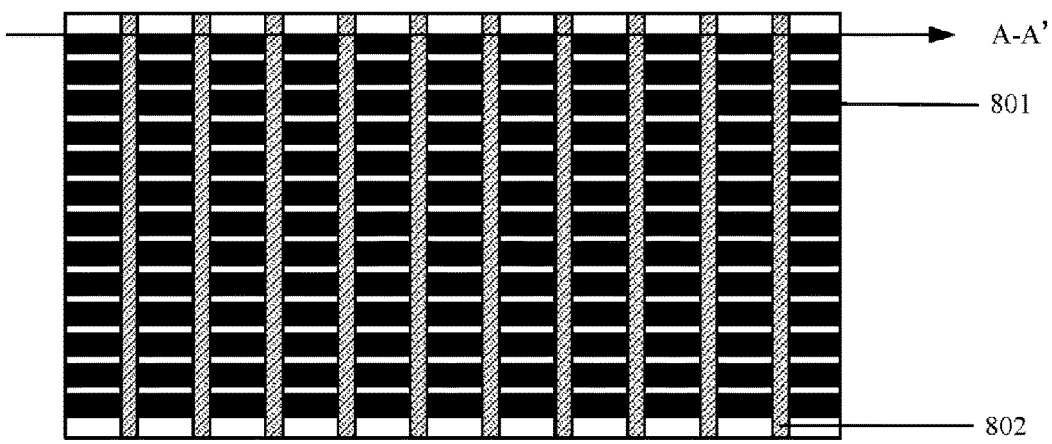
FIGS. 8a-8c schematically illustrate additional arrangements of upper electrodes in a display panel according to an embodiment of the present disclosure.

To further enhance the pressure sensing capability of the display panel to achieve multi-point pressure sensing, FIG. 8a illustrates a top view of another arrangement of upper electrodes provided by an embodiment of the present disclosure. As shown in FIG. 8a, a first upper electrode 801 of each of the one or more pressure sensing units is a strip electrode extending along a second direction (the horizontal direction in FIG. 8a), and a second upper electrode 802 of each of the one or more touch units is a strip electrode extending along a first direction (the vertical direction in FIG. 8a).

Figure 8B:
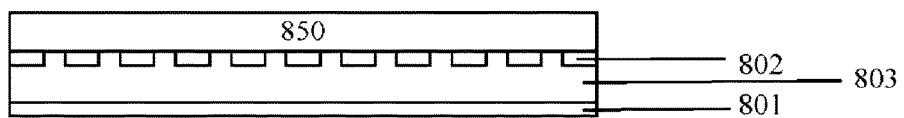

FIG. 8b schematically shows a sectional view of FIG. 8a along the direction A-A'. As shown in FIG. 8b, the first lower electrode 801 of each of the one or more pressure sensing units and the second lower electrode 802 of each of the one or more touch units are electrically insulated from each other by an insulating layer 803.

It is to be noted that although embodiments of the present disclosure are described in FIG. 4, FIG. 8a and FIG. 8b based on an example in which the second upper electrode 802 of each of the one or more touch units is disposed above the first lower electrode 801 of each of the one or more pressure sensing units, the present disclosure is not so limited. In an exemplary embodiment, one or more pressure sensing units may be arranged above one or more touch units, and at that time, as shown in FIG. 8c, the second lower electrode 802 of each of the one or more touch units is arranged below the first lower electrode 801 of each of the one or more pressure sensing units, and the first lower electrode 801 of each of the one or more pressure sensing units and the second lower electrode 802 of each of the one or more touch units are electrically insulated from each other by the insulating layer 803.

Figure 8C:
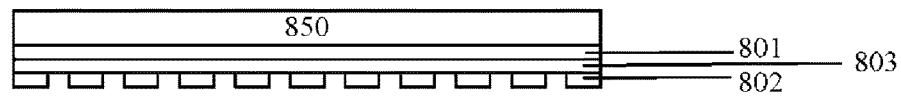

In FIGS. 8b and 8c, the reference numeral 850 generally denotes a structure above the touch unit and the pressure sensing unit, such as a package cover.

When the lower electrodes shown in FIG. 6a are used in combination with the upper electrodes shown in FIG. 8a, the directions along which the second upper electrode 802 of each of the one or more touch units and the second lower electrode 602 of each of the one or more touch units extend intersect each other, so multi-touch can be realized by performing scanning in a row direction and a column direction, respectively. Meanwhile, since the directions along which the first upper electrode 802 of each of the one or more pressure sensing units and the first lower electrode 601 of each of the one or more pressure sensing units extend intersect each other, multi-point pressure sensing can be further achieved by performing scanning in a row direction and a column direction, respectively.

According to another aspect of the present disclosure, there is provided a display device comprising the display panel described in any of the above embodiments.

In embodiments of the present disclosure, the pressure applied on the display device is sensed by means of the piezoelectric effect of the piezoelectric material layer. Compared with the capacitive sensing method in the prior art, the pressure sensing unit in embodiments of the present disclosure has a small thickness and can be advantageously integrated in the display device so that pressure sensing of the display device can be realized without significantly increasing the size of the display device, which in turn facilitates thinning and portability of the display device.

Figure 9:
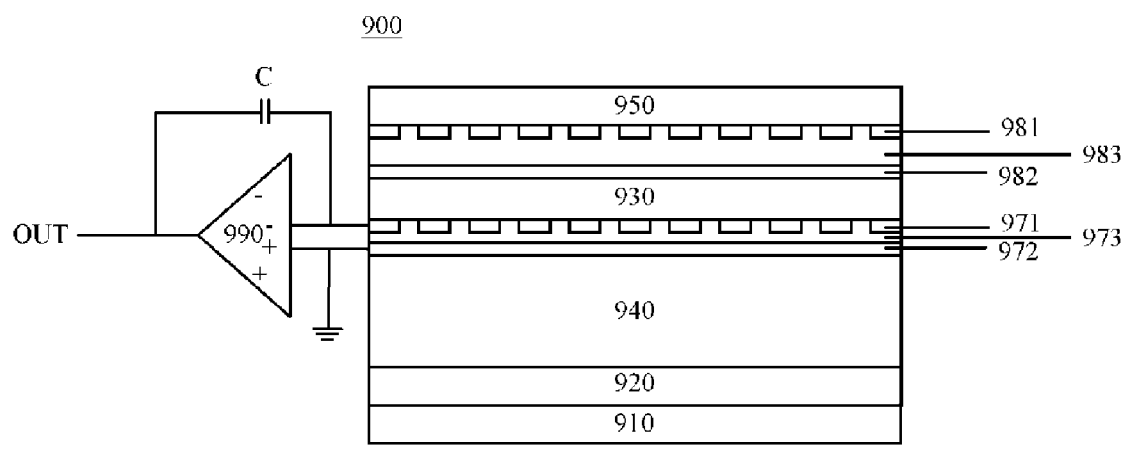
FIG. 9 schematically illustrates a sectional view of a display device according to an embodiment of the present disclosure.

FIG. 9 illustrates a schematic sectional view of a display device according to an embodiment of the present disclosure. As shown in FIG. 9, a display device 900 comprises a backlight unit 910, an array substrate 920 disposed along a light exit direction of the backlight unit 910, a color filter substrate 930 disposed opposite to the array substrate 920, a liquid crystal layer 940 located between the array substrate 920 and the color filter substrate 930, and a package cover 950 disposed above the color filter substrate 930. The display device 900 further comprises one or more pressure sensing units disposed between the liquid crystal layer 940 and the color filter substrate 930, and the one or more pressure sensing units are configured to sense a pressure input on the display device 900. Each of the pressure sensing units includes a first upper electrode 971, a first lower electrode 972 disposed opposite to the first upper electrode 971, and a piezoelectric material layer 973 located between the first upper electrode 971 and the first lower electrode 972. The display device 900 further comprises one or more touch units disposed on a side of the color filter substrate 930 facing away from the array substrate 920. The one or more touch units are configured to sense a touch input on the display device 900.

Each of the touch units includes a second upper electrode 981, a second lower electrode 982 disposed opposite to the second upper electrode 981, and a dielectric material layer 983 located between the second upper electrode 981 and the second lower electrode 982.

Further, in the case where the piezoelectric material layer generates a small amount of charges when subjected to an external force, the display device 900 further comprises an operational amplifier 990 and a feedback capacitor C connected between a negative input terminal and an output terminal OUT of the operational amplifier 900. A positive input terminal of operational amplifier 990 is connected to a first lower electrode 972 of each of the one or more pressure sensing units, and the negative input terminal of operational amplifier 990 is connected to a first upper electrode 971 of each of the one or more pressure sensing units.

In this embodiment, Vout=−Q/C can be derived based on the basic operating mode of the operational amplifier 990, wherein the amount of charges Q is positively correlated with the piezoelectric properties of the piezoelectric material layer and the stress to which it is subjected. By adjusting the capacitance value C of the feedback capacitor, Vout can be adjusted accordingly to be within a recognizable range of a detection circuit.

The present disclosure can be widely applied to various display devices and systems having display devices, for example, a mobile phone, a notebook computer, a television set, and the like.

Those skilled in the art will recognize that the present disclosure is in no way limited to the exemplary embodiments described above. On the contrary, many modifications and variations are possible within the scope of the appended claims. For example, other components may be added to or removed from the described device. Other embodiments may be within the scope of the present disclosure. Furthermore, in the claims, the word "comprise" does not exclude other elements or steps. The mere fact that certain measures are recited in mutually different dependent claims does not indicate that a combination of these measures cannot be used to advantage.

The invention claimed is:

1. A display panel comprising:
an array substrate;
one or more pressure sensing units on the array substrate and configured to sense a pressure input on the display panel; and
one or more touch units on the array substrate and configured to sense a touch input on the display panel,
wherein each pressure sensing unit of the one or more pressure sensing units comprises a first upper electrode, a first lower electrode opposite to the first upper electrode, and a piezoelectric material layer between the first upper electrode and the first lower electrode,
wherein the first lower electrode of each pressure sensing unit comprises a first strip electrode extending along a first direction,
wherein each touch unit of the one or more touch units comprises a second upper electrode and a second lower electrode opposite to the second upper electrode,
wherein the second lower electrode of each touch unit comprises a second strip electrode extending along a second direction intersecting the first direction,
wherein the first upper electrode of each pressure sensing unit comprises a third strip electrode extending along the second direction,
wherein the second upper electrode of each touch unit comprises a fourth strip electrode extending along the first direction,
wherein each pressure sensing unit is on a side of each touch unit away from the array substrate, and
wherein the first upper electrode of each pressure sensing unit is on a side of the second upper electrode of each touch unit away from the array substrate, and the first lower electrode of each pressure sensing unit is on a side of the second lower electrode of each touch unit away from the array substrate.

2. The display panel according to claim 1, wherein each touch unit of the one or more touch units further comprises a dielectric material layer between the second upper electrode and the second lower electrode.

3. The display panel according to claim 2,
wherein the first lower electrode of each pressure sensing unit and the second lower electrode of each touch unit are electrically insulated from each other by an insulating layer.

4. The display panel according to claim 2,
wherein the first upper electrode of each pressure sensing unit and the second upper electrode of each touch unit comprise first strip electrodes extending along a first direction, and
wherein the first upper electrode of each pressure sensing unit and the second upper electrode of each touch unit are electrically insulated from each other by an insulating layer.

5. The display panel according to claim 4,
wherein the first lower electrode of each pressure sensing unit and the second lower electrode of each touch unit comprise second strip electrodes extending along the first direction, and
wherein the first lower electrode of each pressure sensing unit and the second lower electrode of each touch unit are electrically insulated from each other by an insulating layer.

6. The display panel according to claim 3,
wherein the first upper electrode of each pressure sensing unit and the second upper electrode of each touch unit are electrically insulated from each other by an insulating layer.

7. The display panel according to claim 1,
wherein the piezoelectric material layer comprises one or more of zinc oxide, polyvinylidene fluoride, lead zirconate titanate, barium titanate, and lithium niobate.

8. The display panel according to claim 1, wherein the one or more pressure sensing units are further configured as a shielding layer.

9. The display panel according to claim 1, further comprising:
a package cover opposite to the array substrate, and
a luminescent material layer between the array substrate and the package cover.

10. The display panel according to claim 9, wherein the one or more touch units are between the package cover and the luminescent material layer.

11. A display device comprising the display panel according to claim 1.

12. The display device according to claim 11, further comprising:
an operational amplifier; and
a feedback capacitor that is connected between a negative input terminal of the operational amplifier and an output terminal of the operational amplifier, wherein a positive input terminal of the operational amplifier is connected to the first lower electrode of each pressure sensing unit, and wherein the negative input terminal of the operational amplifier is connected to the first upper electrode of each pressure sensing unit.

13. The display device according to claim 11, further comprising:

one or more touch units configured to sense a touch input on the display panel.

14. The display device according to claim 13, wherein each touch unit of the one or more touch units comprises a second upper electrode, a second lower electrode opposite to the second upper electrode, and a dielectric material layer between the second upper electrode and the second lower electrode.

15. The display device according to claim 14, wherein the first lower electrode of each pressure sensing unit comprises a first strip electrode extending along a first direction, wherein the second lower electrode of each touch unit comprises a second strip electrode extending along a second direction intersecting the first direction, and wherein the first lower electrode of each pressure sensing unit and the second lower electrode of each touch unit are electrically insulated from each other by an insulating layer.

* * * * *